United States Patent
Bonner et al.

(10) Patent No.: US 9,412,124 B2
(45) Date of Patent: Aug. 9, 2016

(54) MULTI-ITEM SCANNING SYSTEMS AND METHODS OF ITEMS FOR PURCHASE IN A RETAIL ENVIRONMENT

(75) Inventors: Brett Bracewell Bonner, New Richmond, OH (US); Christopher Todd Hjelm, Cincinnati, OH (US); William Rodney McMullen, Cincinnati, OH (US)

(73) Assignee: SUNRISE R&D HOLDINGS, LLC, Cincinnati, OH (US)

( * ) Notice: Subject to any disclaimer, the term of this patent is extended or adjusted under 35 U.S.C. 154(b) by 646 days.

(21) Appl. No.: 12/236,481

(22) Filed: Sep. 23, 2008

(65) Prior Publication Data

US 2009/0090583 A1    Apr. 9, 2009

Related U.S. Application Data

(60) Provisional application No. 60/974,484, filed on Sep. 23, 2007.

(51) Int. Cl.
*A47F 9/04* (2006.01)
*G06Q 30/06* (2012.01)

(52) U.S. Cl.
CPC ........................................ *G06Q 30/06* (2013.01)

(58) Field of Classification Search
CPC ............. A47F 9/02; A47F 9/046; G06K 7/10; G06K 7/14; G06K 9/00; G06Q 30/06
USPC ...................... 186/59, 61; 235/462.02, 462.32
See application file for complete search history.

(56) References Cited

U.S. PATENT DOCUMENTS

| | | | |
|---|---|---|---|
| 4,939,355 A | 7/1990 | Rando et al. | |
| 5,252,814 A | 10/1993 | Tooley | |
| 5,426,282 A | 6/1995 | Humble | |
| 5,436,439 A | 7/1995 | Nishimura et al. | |
| 5,540,301 A | 7/1996 | Dumont | |
| 5,555,090 A * | 9/1996 | Schmutz | 356/601 |
| 5,747,784 A * | 5/1998 | Walter et al. | 235/383 |
| 5,984,186 A | 11/1999 | Tafoya | |
| 6,213,397 B1 | 4/2001 | Rando | |

(Continued)

FOREIGN PATENT DOCUMENTS

| | | |
|---|---|---|
| CA | 2 556 778 | 9/2005 |
| CA | 2 600 101 | 2/2008 |

(Continued)

OTHER PUBLICATIONS

Office Action issued in Japanese Patent Application No. 2011-500817, mailed Mar. 2, 2011, pp. 1-2, English Translation included.

(Continued)

*Primary Examiner* — Mark Beauchaine
(74) *Attorney, Agent, or Firm* — Pillsbury Winthrop Shaw Pittman LLP

(57) ABSTRACT

A system and method for scanning items for purchase in a retail environment is provided that has the ability to scan multiple items within its scan field of view simultaneously or nearly simultaneously in a multi-scanning type of configuration. In addition to the simultaneous scanning, the identity of each scanned item is discovered and then added to a running tally of items to be later purchased in a point of sale terminal.

21 Claims, 3 Drawing Sheets

(56) References Cited

U.S. PATENT DOCUMENTS

| | | | |
|---|---|---|---|
| 6,347,740 B1 | 2/2002 | Bengala | |
| 6,360,947 B1 | 3/2002 | Knowles et al. | |
| 6,382,515 B1 | 5/2002 | Good et al. | |
| 6,517,004 B2 | 2/2003 | Good et al. | |
| 6,554,189 B1 | 4/2003 | Colavito et al. | |
| 6,561,424 B1 | 5/2003 | Dickson et al. | |
| 6,565,004 B2 | 5/2003 | Ishii et al. | |
| 6,588,665 B2 | 7/2003 | Knowles et al. | |
| 6,616,048 B2 | 9/2003 | Good et al. | |
| 6,659,344 B2 | 12/2003 | Otto | |
| 6,705,528 B2 | 3/2004 | Good et al. | |
| 6,820,062 B1 | 11/2004 | Gupta et al. | |
| 6,851,610 B2 | 2/2005 | Knowles et al. | |
| 6,858,826 B2* | 2/2005 | Mueller et al. | 250/208.1 |
| 6,923,374 B2 | 8/2005 | Knowles et al. | |
| 6,991,167 B2 | 1/2006 | Check et al. | |
| 7,000,839 B2 | 2/2006 | Good et al. | |
| 7,083,102 B2 | 8/2006 | Good et al. | |
| 7,086,597 B2 | 8/2006 | Good | |
| 7,104,453 B1* | 9/2006 | Zhu et al. | 235/462.14 |
| 7,104,454 B2 | 9/2006 | Good et al. | |
| 7,108,187 B2* | 9/2006 | Turvy et al. | 235/462.08 |
| 7,159,777 B2 | 1/2007 | Silverbrook et al. | |
| 7,229,015 B2 | 6/2007 | Persky et al. | |
| 7,248,754 B2 | 7/2007 | Cato | |
| 7,275,693 B2 | 10/2007 | Good et al. | |
| 7,334,729 B2 | 2/2008 | Brewington | |
| 7,337,960 B2* | 3/2008 | Ostrowski et al. | 235/383 |
| 7,383,996 B2 | 6/2008 | Good et al. | |
| 7,387,241 B2 | 6/2008 | Hassenbuerger | |
| 7,448,542 B1 | 11/2008 | Bobbitt et al. | |
| 7,742,952 B2 | 6/2010 | Bonner et al. | |
| 7,783,527 B2 | 8/2010 | Bonner et al. | |
| 2005/0098633 A1 | 5/2005 | Poloniewicz et al. | |
| 2005/0110638 A1 | 5/2005 | Mohr | |
| 2005/0149391 A1* | 7/2005 | O'Shea et al. | 705/14 |
| 2006/0181458 A1 | 8/2006 | Niu | |
| 2006/0193262 A1 | 8/2006 | McSheffrey et al. | |
| 2006/0289637 A1 | 12/2006 | Brice et al. | |
| 2007/0138268 A1 | 6/2007 | Tuchman | |
| 2008/0040219 A1 | 2/2008 | Kim et al. | |
| 2008/0121689 A1* | 5/2008 | Good et al. | 235/375 |
| 2008/0189170 A1 | 8/2008 | Ramachandra | |
| 2008/0228600 A1 | 9/2008 | Treyz et al. | |
| 2009/0240571 A1 | 9/2009 | Bonner et al. | |
| 2010/0057541 A1 | 3/2010 | Bonner et al. | |

FOREIGN PATENT DOCUMENTS

| | | |
|---|---|---|
| CN | 101542548 A | 9/2009 |
| EP | 01717772 A1 | 11/2006 |
| JP | 04-372098 | 12/1992 |
| JP | 08-290774 | 11/1996 |
| JP | H09-132146 A | 5/1997 |
| JP | 2002-041761 A | 2/2002 |
| JP | 2002-342540 A | 11/2002 |
| JP | 2004-320276 A | 11/2004 |
| JP | 2004-355317 A | 12/2004 |
| JP | 2005-292909 A | 10/2005 |
| JP | 2006-266859 A | 10/2006 |
| JP | 2007-109058 A | 4/2007 |
| JP | 2007/300572 | 11/2007 |
| JP | 2010-020779 A | 1/2010 |
| KR | 10-2005-0032663 | 4/2005 |
| KR | 10-0770144 B1 | 10/2007 |
| WO | 03/075125 | 9/2003 |
| WO | 2007/002941 | 1/2007 |

OTHER PUBLICATIONS

Office Action as issued for Canadian Patent Application No. 2,709,757, dated Oct. 19, 2011.

Notice to File a Response as issued in Korean Patent Application No. 10-2009-0063928, dated Nov. 5, 2015, (13 pages).

Office Action as issued in Canadian Patent Application No. 2,719,194, dated May 12, 2015, (5 pages).

Notice of Reasons for Rejection as issued in Japanese Patent Application No. 2013-519826, dated May 19, 2015, (8 pages).

Notice to File a Response as issued in Korean Patent Application No. 10-2010-7025946, dated Oct. 12, 2015, (13 pages).

First Examination Report as issued in Indian Patent Application No. 1687/MUMNP/2010, dated Sep. 11, 2015, (2 pages).

Reexamination Notification as issued in Chinese Patent Application No. 200980153403.7, dated Aug. 5, 2015, (17 pages).

First Office Action as issued in Chinese Patent Application No. 201180044684.X, dated Dec. 30, 2015, (19 pages).

Office Action as issued in Canadian Patent Application No. 2,741,659, dated Jan. 29, 2016, (3 pages).

Office Action as issued in Canadian Patent Application No. 2,741,654, dated Feb. 9, 2016, (6 pages).

* cited by examiner

MULTI-ITEM SCANNING SYSTEMS AND METHODS OF ITEMS FOR PURCHASE IN A RETAIL ENVIRONMENT

CLAIM OF PRIORITY TO RELATED APPLICATIONS

This non-provisional patent application claims priority to U.S. Provisional Patent Application 60/974,484 filed on Sep. 23, 2007 all of which subject matter is hereby incorporated by reference herein.

FIELD OF THE INVENTION

The invention relates to retail scanning systems and methods thereof In particular, retail scanning systems and methods are provided herein whereby multiple items entering the field of view of a multi-item scanning device may be simultaneously scanned, identified and stored for later processing at a point of sale station or device.

BACKGROUND OF THE INVENTION

Optical systems for reading optical code symbols such as bar code, matrix code and two-dimensional symbologies are well known. Some known imaging optical code reading systems are capable for reading a variety of different codes from various angles and distances. Generally, imagers and laser beam scanning systems electro-optically transform optical code into electrical signals that are decoded into alpha-numerical characters or other data. These data are in digital form and are used as input to a data processing system in, for example, a point of sale (POS) environment for looking up a price for the article.

Over time advances in scanning technology have been produced and implemented in many retail and/or package handling environments. For example, in certain package handling environments, high-speed scanning that encompasses 360° or near 360° scanning has been used with great success. In certain retail environments, lower speed scanning that encompasses 360° or near 360° scanning (i.e., omnidirectional) has also met with a certain level of success. However, improvements of such scanning, especially in the retail environment, can still be made.

For example, U.S. Pat. No. 5,019,714 (Knowles) provides a laser scanning system that includes plural modular laser scanners. Each laser scanner produces a line scan pattern. Each module is arranged to receive light reflected from an object to convert that light into electrical output signals. The system also includes means for decoding the output signals and for providing the decoded signals to a peripheral device like a computer.

In another example, U.S. Pat. No. 5,252,814 (Tooley) provides a scanner at a checkout counter that appears to provide a scanning operation for items to be purchased. Interestingly, the '814 patent uses scanning light beam type of optical scanners placed at various angles about a digitizing plate on which the items for purchase are placed for scanning. FIG. 1 of the '814 patent indicates that use of the scanning system herein necessitates a custom designed, two-tiered check-out lane. Such an approach is problematic because use of the '814 patent's scanning system necessitates the use of newly designed, constructed and installed check-out lanes. Given that a typical retail store like a grocery store could have ten or more such check-out lanes, use of the '814's patent's scanning system would be cost prohibitive.

Also, U.S. Pat. No. 5,436,439 (Nishimura, et al.) provides a laser scanning bar code reader. A conveyor conveys items for purchase to the reader. The laser scanning bar code system herein consists of two laser scanning devices positioned above the conveyor surface that scan the bar codes of items conveyed beneath the two laser scanning devices.

U.S. Pat. No. 6,330,973 (Bridgelall, et al.) provides code reading systems with plural imaging or scanning modules pointed in various directions toward a target item.

What is therefore needed is a system that has the ability to scan, identify and catalogue multiple items at once for faster, more efficient check-outs in retail establishments.

BRIEF DESCRIPTION OF THE INVENTION

Accordingly, the invention provides a system for simultaneously scanning multiple items for purchase in a retail establishment comprising a conveying device on which the items are conveyed and a multi-item scanning device positioned onto the conveying device. The multi-item scanning device has at least two imaging devices attached to the multi-item scanning device for scanning multiple items for purchase. In practice, the two or more imaging devices create a field of view in which the system scans the at least two items for purchase substantially simultaneously and preferably simultaneously within the field of view.

The system preferably further comprises a memory device that records the identity of each item scanned within the field of view. The memory device is regulated and controlled by software that also catalogues and organizes the identity of each item scanned within the field of view.

In practice and preferably, each item for purchase that is scanned through the multi-item scanning device comprises readable media that possesses product identity information therein and which is scannable by the multi-item scanning device. The multi-item scanning device scans the readable media on an item for purchase. In one preferred embodiment herein, the multi-item scanning device comprises a housing that has an external surface and an internal surface positioned oppositely to the external surface. Within the housing, multiple imaging devices are attached to the internal surface of the housing.

When multiple imaging devices are positioned within the housing they are preferably attached to the internal surface of the housing in multiple orientations and operate to create a 360° field of view within the housing. Software further operates to distinguish and identify multiple items simultaneously scanned by the multi-item scanning device. The software may also operate to store into memory the identity each item scanned through the multi-item scanning device.

When two or more items are scanned simultaneously between about 50% to about 99% of the readable media on all of the items scanned are read by the multi-item scanning device. Preferably between about 70% and about 99% of the readable media on all of the items scanned are read by the multi-item scanning device. In the cases in which readable media is not successfully scanned those one or more items are identified by the system as having not been scanned.

Also provided herein is a method of simultaneously scanning and identifying multiple items for purchase. The method provides the following steps:

i) Providing a conveying device having a conveyor;
ii) Providing a multi-item scanning device that is attached to the conveying device whereby the multi-item scanning device is attached to the conveying device at a point downstream of the conveyor;

iii) Conveying two or more items on the conveyor starting from a point upstream on the conveyor to a point downstream on the conveyor to the multi-item scanning device; and iv) Scanning the two or more items substantially simultaneously in the multi-item scanning device, the scanning occurring within a field of view resident within the multi-item scanning device.

An additional preferred step in the method is the recording of the identity of each item scanned within the field of view with a memory device connected to or in communication with the multi-item scanning device. In practice, multiple items conveyed on the conveyor may be conveyed in multiple configurations and orientations without regard to a particular formation for scanning.

Additionally, a method for later scanning mis-scanned readable media on an item is provided herein. The method provides the following steps:

a) Conveying multiple items to a point-of-sale station;
b) Scanning the multiple items with a multi-scanning device;
c) Mis-scanning at least one item for purchase;
d) Identifying the at least one mis-scanned item conveyed to the point-of-sale station;
e) Alerting an operator to the at least one mis-scanned items; and
f) Re-scanning the at least one mis-scanned items.

In practice each item identified as mis-scanned item is preferably photographed by a photographic or other imaging device or is otherwise identified as a mis-scanned item by, for example, digital or electronic labeling. An image is produced from each photographed unscanned item. An operator views each photo or electronic label produced for each mis-scanned item. Upon item identification the operator re-scans each mis-scanned item based upon each photo or digital identification produced to identify each said unscanned item.

BRIEF DESCRIPTION OF THE DRAWINGS

While the specification concludes with claims particularly pointing out and distinctly claiming the invention, it is believed that the embodiments set forth herein will be better understood from the following description in conjunction with the accompanying figures, in which like reference numerals identify like elements and in which:

DESCRIPTION OF THE INVENTION

Figure 1:
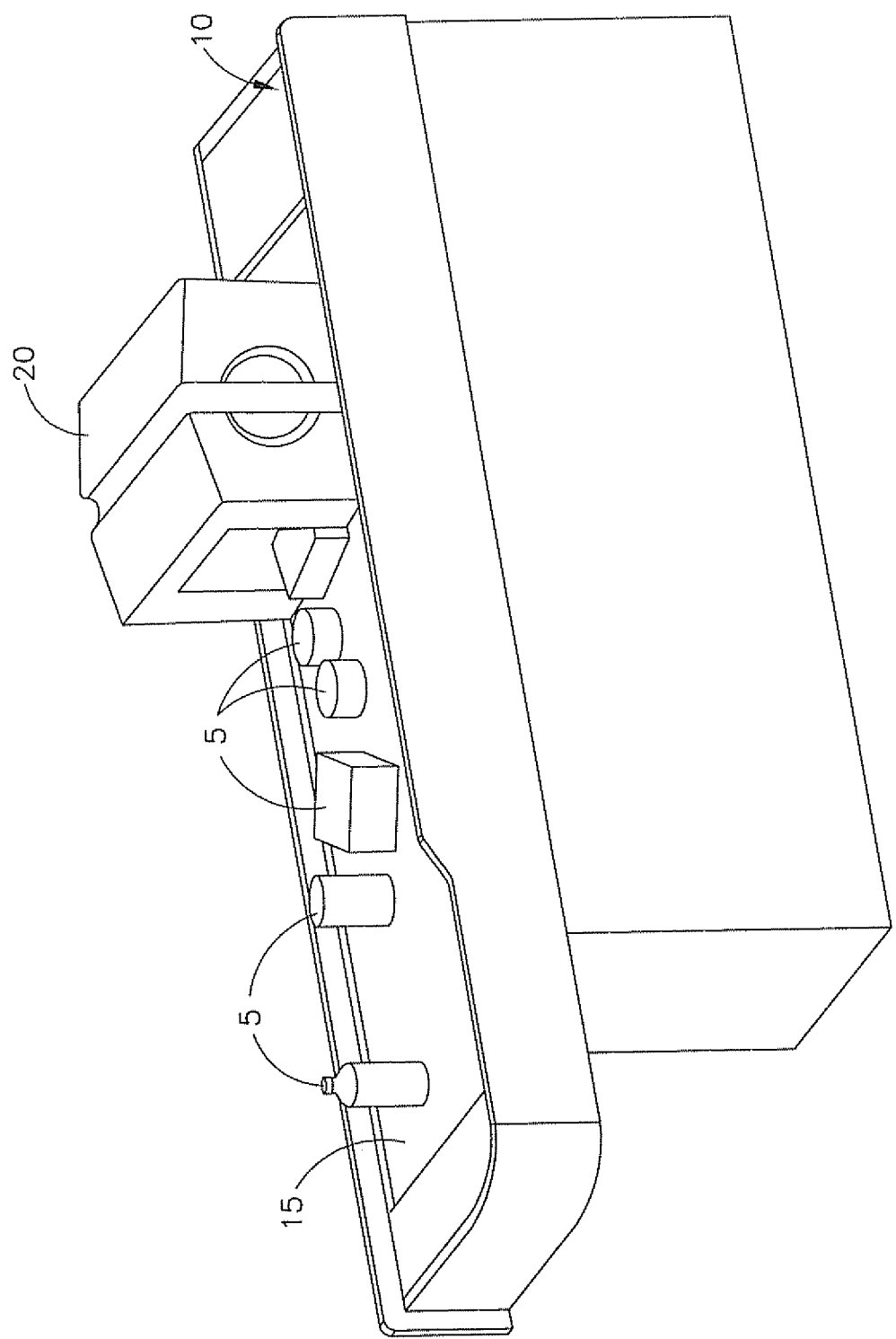
FIG. 1 provides a perspective view of a check-out lane with a multi-scanning device positioned thereon.

By the term "readable media" it is meant herein all manner of machine and/or digitally readable indicia that contains information including but not limited to barcodes, UPC code, Aztec Code, DataMatrix 2D barcode, RFID and other such readable media being read and decoded by all manner of optical scanning devices commonly known in the art.

By the term "retail establishment" it is meant herein any and all manner of retail stores in which at least one check-out lane would be suitable for use in a store including but not limited to a grocery store, hardware store, consumer goods store and other store types.

The invention provides a system for simultaneously scanning multiple items for purchase in a retail establishment comprising a conveying device on which said items are conveyed and a multi-item scanning device positioned onto the conveying device. The multi-item scanning device has at least two imaging devices attached to the multi-item scanning device for scanning multiple items for purchase. In practice, the two or more imaging devices create a field of view in which the system scans the at least two items for purchase substantially simultaneously and preferably simultaneously within the field of view.

The system preferably further comprises a memory device that records the identity of each item scanned within the field of view. The memory device is regulated and controlled by software that also catalogues and organizes the identity of each item scanned within the field of view. A preferred memory device is a server grade computer of the type and kind manufactured by DELL®, IBM® or APPLE®.

Controlling software for the memory device and/or the multi-item scanning device is important. The software is responsible for enabling the system to properly identify, catalogue and then store each scanned item scanned by the multi-item scanning device. The software is also responsible for managing and controlling each imaging device's operation within the multi-item scanning device. By the term "software" it is meant herein one or more computer operable programs suitable for directing the performance of tasks necessary to operate the systems and the methods herein.

In practice and preferably, each item for purchase that is scanned through the multi-item scanning device comprises readable media that possesses product identity information therein and which is scannable by the multi-item scanning device. The multi-item scanning device scans the readable media on an item for purchase. In one preferred embodiment herein, the multi-item scanning device comprises a housing that has an external surface and an internal surface positioned oppositely to the external surface. Within the housing, multiple imaging devices are attached to the internal surface of the housing.

When multiple imaging devices are positioned within the housing they are preferably attached to the internal surface of the housing in multiple orientations and operate to create a 360° field of view within the housing. Software further operates to distinguish and identify multiple items simultaneously scanned by the multi-item scanning device. The software may also operate to store into memory the identity each item scanned through the multi-item scanning device.

When two or more items are scanned simultaneously between about 50% to about 99% of the readable media on all of the items scanned are read by the multi-item scanning device. Preferably between about 70% and about 99% of the readable media on all of the items scanned are read by the multi-item scanning device. In the cases in which readable media is not successfully scanned (i.e., mis-scanned) those one or more items are identified by the system as having not been scanned.

Also provided herein is a method of simultaneously scanning and identifying multiple items for purchase. The method provides the following steps:

i) Providing a conveying device having a conveyor;
ii) Providing a multi-item scanning device that is attached to the conveying device whereby the multi-item scanning device is attached to the conveying device at a point downstream of the conveyor;
iii) Conveying two or more items on the conveyor starting from a point upstream on the conveyor to a point downstream on the conveyor to the multi-item scanning device; and iv) Scanning the two or more items substantially simultaneously in the multi-item scanning device, the scanning occurring within a field of view resident within the multi-item scanning device.

An additional preferred step in the method is the recording of the identity of each item scanned within the field of view with a memory device connected to or in communication with the multi-item scanning device. In practice, multiple items conveyed on the conveyor may be conveyed in multiple configurations and orientations without regard to a particular formation for scanning.

A multi-network in a store may be used as the locus of the recording of each item scanned within a field view in a multi-item scanning device. Specifically, the system for scanning one or more items herein may be in operative communication with a store's multi-network whereby one or more memory devices attached to the multi-network may be used to store, identify and organize the identity of one or more items for purchase scanned within a multi-item scanning device herein. A suitable store multi-network of the kind discussed herein is disclosed in U.S. patent application Ser. No. 12/172,326 filed on Jul. 25, 2008 the substance of which patent applications are all incorporated by reference herein.

Additionally, a method for later scanning mis-scanned readable media on an item is provided herein. The method provides the following steps:
  a) Conveying multiple items to a point-of-sale station;
  b) Scanning the multiple items with a multi-scanning device;
  c) Mis-scanning at least one item for purchase;
  d) Identifying the at least one mis-scanned item conveyed to the point-of-sale station;
  e) Alerting an operator to the at least one mis-scanned items; and
  f) Re-scanning the at least one mis-scanned items.

In practice each item identified as mis-scanned is preferably photographed by a photographic or other imaging device or is otherwise identified as a mis-scanned item by, for example, digital or electronic labeling. An image is produced from each photographed unscanned item. An operator views each photo or electronic label produced for each mis-scanned item. Upon item identification the operator re-scans each mis-scanned item based upon each photo or digital identification produced to identify each said unscanned item.

FIG. 1 provides a perspective view of a check-out lane 10 with a multi-item scanning device 20 positioned thereon. As shown, the multi-item scanning device 20 is placed at a position downstream on the check-out lane 10. Multiple items for purchase 5 are positioned on check-out lane 5, i.e., the conveyor 15 thereof, and are meant to be shown moving in a left to right orientation, such movement occurring from upstream on the conveyor 15 to downstream on the conveyor 15.

Figure 2:
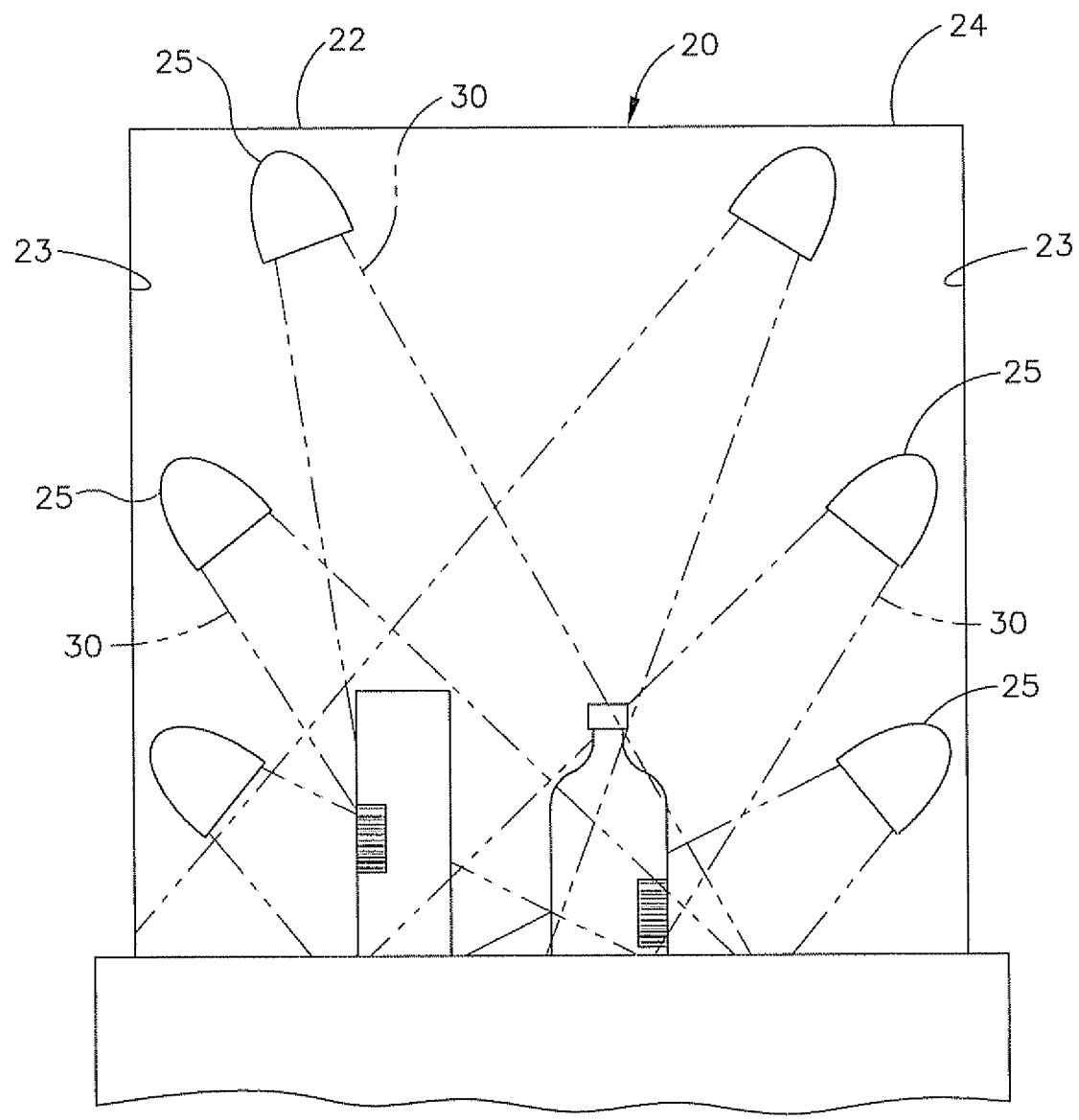
FIG. 2 provides an upstream view of the inner surface of one embodiment of the multi-scanning device herein.

As noted hereinabove multiple items for purchase 5 may enter the multi-item scanning device 20 at the same time or nearly simultaneously. Upon such entry, each item 5 also enters a field of view 30 created by two or more scanning devices 25 (FIG. 2). Preferably, the field of view 30 provides 360° scanning orientation so that readable media attached to an item 5 is readable irrespective of the physical orientation of the readable media. Such 360° scanning orientation is important because it enables 1) a greater possibility of an actual and accurate scan of readable media on an item for purchase 5 irrespective of the orientation of the readable media on an item 5 and 2) it allows for the simultaneous scanning of two or more items for purchase 5 that exist within the field of view 30.

Beneficially, the system allows for the greater possibility of an accurate scan of an item's readable media irrespective of its singular orientation or its orientation with respect to one or more other items present within a the field of view 30 of multi-item scanning device 20. Because of the 360° scanning orientation created within the field of view 30 readable media on items 5 the opportunity for mis-scans is diminished. This is an important feature because the system herein is designed to be continuous or nearly continuous so that a shopper's check-out time is diminished in comparison to traditional check-out methods.

FIG. 2 provides a view of multi-item scanning device 20 from the perspective of one looking into the device 20 from an upstream position. As shown, scanning devices 25 are positioned about the interior of multi-item scanning device 20 in various and diverse orientations. The effect of the number and orientations of the various scanning devices 25 is to create a 360° or omni-directional scanning orientation within multi-item scanning device 20. It should also be stated that such scanning devices 25 are positioned about the length of multi-item scanning device 20. This is an important feature because such positioning creates a three-dimensional field of view 30 instead of a two-dimensional field of view 30 that would be less effective for the simultaneous scanning of multiple items within the field of view 30.

Figure 3:
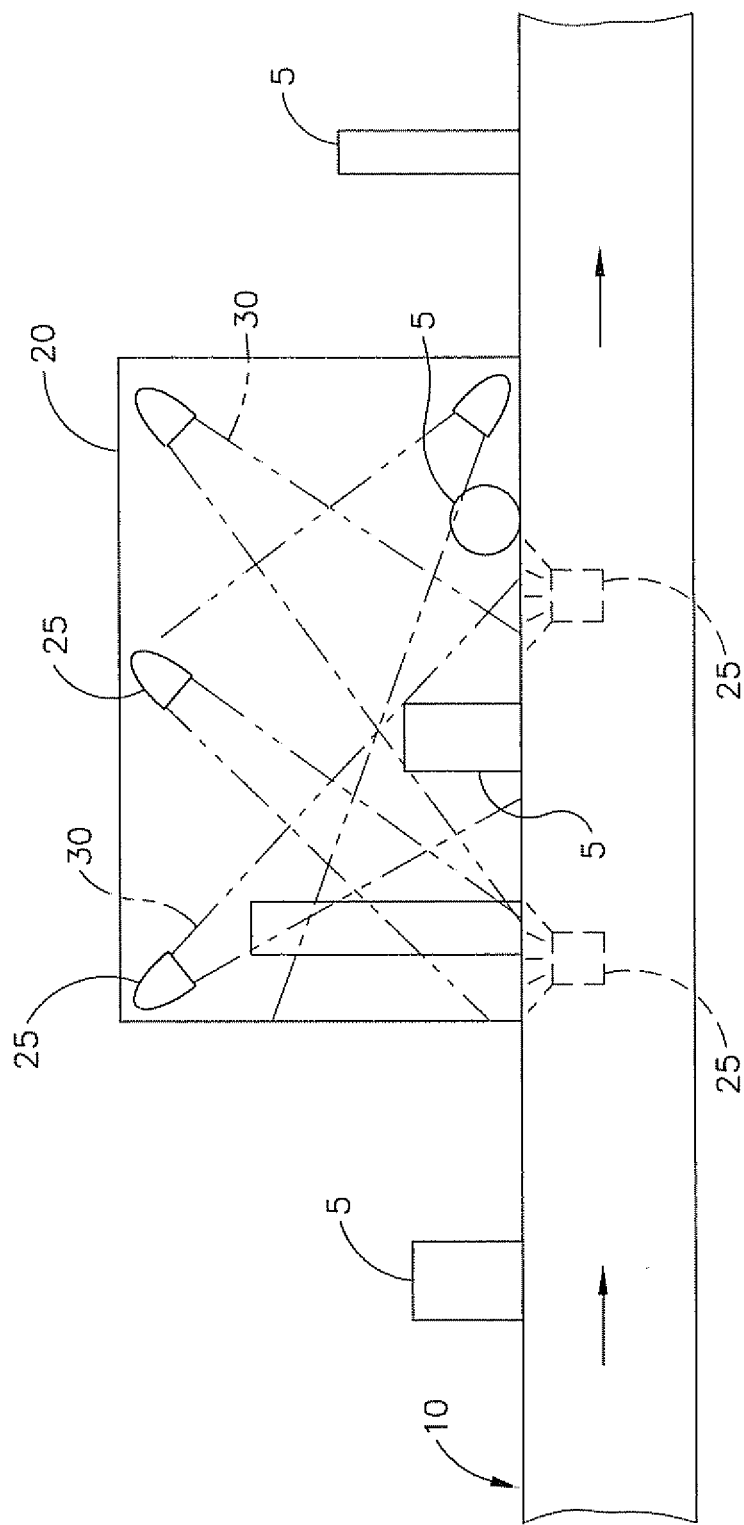
FIG. 3 is a side partial view of the multi-scanning device herein with items for purchase traveling therethrough.

In FIG. 3 a partial check-out lane 10 is provided with multiple items 5 for purchase moving through and being scanned in a multi-item scanning device 20. Several scanning devices 25 are shown which operate to create an omnidirectional or 360° field of view 30 inside of the multi-item scanning device 20. As shown, multiple items 5 may be scanned simultaneously within multi-item scanning device 20. Within device 20 items 5 may be scanned multiple times as a redundant feature to ensure that readable media on each item 5 is read and each scanned item 5 is identified. Such scanning preferably also occurs upwardly as is shown by scanning devices 25 shown hidden within check-out lane 10.

As is shown in FIG. 3, field of view 30 preferably exists within every area of multi-item scanning device 20 in which readable media on a items 5 may pass through. Preferably, field of view 30 covers nearly every square inch (or square cm) in all three dimensions of device 20. Such coverage helps to enable accurate scanning of each item 5 conveyed through multi-item scanning device 20.

During scanning, items for purchase 5 are continuously conveyed into and out of multi-item scanning device 20, preferably, without stopping and most preferably without substantially slowing down once they reach the multi-item scanning device 20. Items 5 passing through the multi-item scanning device 20 may be randomly configured. By the term "randomly configured" it is meant herein that they may be placed onto a conveyor 15 leading into the multi-item scanning device without regard to the position of barcode on the item and thus may be oriented in almost any configuration for scanning within the multi-item scanning device 20.

In practice, items 5 passing through the multi-item scanning device's field of view 30 at about the same moment in time or concurrently may be concurrently scanned, separately identified and separately recorded for later processing at a point of sale (POS) terminal like a cash register. Items 5 conveyed through multi-item scanning device 20 typically comprise one or more readable media like bar codes positioned thereon whereby multi-item scanning device 20 may scan and record the bar code of each item for item identification.

As shown in FIGS. 2 and 3 herein multi-item scanning device 20 preferably comprises two or more scanning devices 25 positioned about interior 23 of casing 24. More preferably, multi-item scanning device 20 comprises between about two to about twenty scanning devices 25 positioned about interior 23 of casing 24. Persons of skill will readily recognize that more than twenty scanning devices 25 may be used. The appropriate number of scanning devices 25 to be used is a design choice and hinges upon the area and degree of scanning coverage producible and desirable in a field of view 30 of multi-item scanning device 20. To that end, the preferred field of view 30 of multi-item scanning device 20 herein is omnidirectional. By the term "omnidirectional" it is meant herein that scanning of a purchasable item (i.e., scanning the bar code of the purchasable item) is possible regardless of the orientation of the bar code on a purchasable item. Most preferably, field of view 30 of multi-item scanning device 20 provides a 360° field of view 30 at substantially any point within the multi-item scanning device. A 360° field of view 30 is important herein because such is not limited by, for example, bar code on a purchasable item that is held adjacent to the surface of a conveyor—e.g., when a purchasable item's bar code is positioned on the bottom of the item's packaging and that package is oriented right-side up.

The one or more scanning device 25 positioned within multi-item scanning device 20 may be oriented at multiple suitable orientations without limit in order to facilitate, firstly, a field of view 30 capable of omnidirectional scanning, and secondly, but preferably, a field of view capable of 360° scanning. In an alternative embodiment herein, scanning devices 25 may be so oriented as to provide a redundant scanning feature. By the term "redundant scanning" it is meant herein that after the first scan of a purchasable item passing through the multi-item scanning device 20 that such item will be scanned at least once more to verify its identity. This redundant scanning could also be done as a further check to ensure accuracy of the identity of scanned purchasable items.

In addition to providing redundant scanning, multi-item scanning device 20 herein may also provide an imaging function for each item scanned. That is, at the moment of a first scan of an item 5, a redundant scan of the item 5 or both, a digital image of the scanned item is also recorded. This image is later added to the information generated about the item 5 such that a store associate and/or customer can verify, visually, the identity of one more items 5 scanned by multi-item scanning device 20. Such images could later be provided to the customer once payment for all of the items has been received and the financial transaction concluded.

Multi-item scanning device 20 may be of any suitable height, length or geometric configuration that facilitates the various sizes and orientations of purchasable items to be scanned. In particular, a preferred multi-item scanning device 20 herein shall accommodate nearly any purchasable item that would normally be placed onto a conveyor for scanning and check-out in a grocery store, consumer goods store and the like. So long as a item 5 for purchase has one or more readable media and has the proper physical dimensions to travel through multi-scanning device 20 it is suitable for scanning therein.

Multi-item scanning device 20 may comprise a theft mitigation system. Items entering and travelling through the multi-item scanning device 20 should all, approximately, travel therethrough at the same rate or speed. In the event that an item travels through the multi-item scanning device 20 at a rate of speed outside of the known standard deviation for such items. The travel of each such item 5 will be recognized by multi-item scanning device 20 through a speed detection device. Such speed detection is substantially instantaneous. A preferred manner of speed detection occurs by use of commonly known and used radar detection systems; e.g., radar systems that use K band, Ka band and/or X band radar transmissions. At such detection multiple actions may occur: 1) the conveyor about which the multi-item scanning device stops and a store associate is alerted in order to review the event; 2) a store associate is alerted to the event while the conveyor continues to convey items for purchase 5 through multi-item scanning device 20; 3) a visual image of the item passed through the multi-item scanning device at a higher than expected rate of speed is taken and subsequently reviewed by a store associate; or 4) a combination of any of the previous three items can occur.

Multi-item scanning device 20 may comprise several types of scanning devices 25. For example, the multi-item scanning device 20 may comprise image scanners. An image scanner takes a picture of an item or an object on an item moving through the multi-item scanning device 20. The picture captures the bar code (or other similar identifying attribute) and then decodes the bar code from the image to identify the item. Suitable image scanners for use herein are produced any one of the following companies: METROLOGIC®; SYMBOL®; or HANDHELD PRODUCTS®.

Multi-item scanning device 20 may also comprise a traditional type of scanning device like a pen type scanner or a laser type scanner. Such laser scanners operate by reading the barcode or other readable media directly on an item for purchase and then decode the read image by a decoder. Such scanning devices have been in existence for many years and are well known in the prior art.

In addition, two or more types of scanning devices may be used together within multi-item scanning device 20. Whatever types and/or configurations that produce the desired field of view substantially within multi-item scanning device 20 is what is sought herein. Persons of skill in the art will readily recognize the myriad choices of scanning device types as well as their configurations within multi-item scanning device 20 herein.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such intent will be explicitly recited in the claim. And in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

What is claimed is:

1. A system for simultaneously scanning readable media on multiple items for purchase in a retail establishment, comprising:
   a) A conveying device on which said items are conveyed; and
   b) A multi-item scanning device positioned about said conveying device, said multi-item scanning device having
      i) a housing positioned about said conveying device, said housing having an external surface and an internal surface positioned oppositely to said external surface; and
      ii) multiple imaging devices attached to and about said internal surface of said housing of said multi-item scanning device for scanning said readable media on each said multiple item for purchase, said multiple imaging devices creating a 360° field of view wherein all sides of said multiple items may be observed by the imaging devices and whereby said multi-item scanning device scans said scannable readable media of at least two said multiple items for purchase substantially simultaneously within said field of view, the multiple imaging devices further being configured and arranged such that substantially all of a volume encompassed by the housing is covered by the field of view, including a bottom surface of said items, wherein the multiple imaging devices are further configured and arranged to ensure redundant scanning of each item during a single pass through the housing such that after a first scan of each item, that item is scanned at least once more.

2. A system of claim 1 further comprising
   c) A memory device that records the identity of each said item scanned within said field of view.

3. The system of claim 2 further comprising
   d) Software that controls said memory device, said software cataloging and organizing each said identity of each said item scanned within said field of view.

4. The system of claim 3 wherein said software distinguishes between one scanned said item for purchase and another scanned said item for purchase.

5. The system of claim 3 whereby said software further operates to identify multiple items simultaneously scanned by said multi-item scanning device.

6. The system of claim 5 whereby said software further operates to distinguish multiple items simultaneously scanned by said multi-item scanning device.

7. The system of claim 3 whereby said software further operates to store each said scanned readable media of each said item scanned into a memory device.

8. The system of claim 1 wherein between 50% and about 69% of said readable media on each said item conveyed to a point-of-sale station is read.

9. The system of claim 8 wherein substantially all unscanned said readable media on one or more said items is identified by said system as being unscanned.

10. The system of claim 1 wherein between about 70% and about 99% of said readable media on each said item for purchase is scanned by said multi-item scanning device.

11. The system of claim 10 wherein substantially all unscanned said readable media on one or more said items for purchase is identified as being unscanned.

12. A method of simultaneously scanning readable media on multiple items for purchase in a retail establishment using a conveying device having a conveyor wherein a multi-item scanning device is attached to said conveying device, said multi-item scanning device having
   i) a housing positioned about said conveying device, said housing having an external surface and an internal surface positioned oppositely to said external surface; and
   ii) multiple imaging devices attached to and about said internal surface of said housing of said multi-item scanning device for scanning said readable media on each said multiple item for purchase, said multiple imaging devices creating at 360° field of view wherein all sides of said multiple items may be observed by the imaging devices and whereby said multi-item scanning device scans said scannable readable media of at least two said multiple items for purchase substantially simultaneously within said field of view the multiple imaging devices further being configured and arranged such that substantially all of a volume encompassed by the housing is covered by the field of view, including a bottom surface of said items;

the method comprising:
conveying two or more items on said conveyor starting from a position upstream on said conveyor to a position downstream on said conveyor to said multi-item scanning device;
scanning said readable media on said two or more items substantially simultaneously in said multi-item scanning device, within the field of view; and
redundantly scanning each item at least a second time during a single pass through the housing such that after a first scan of each item, that item is scanned at least once more.

13. The method of claim 12 whereby said multiple items conveyed on said conveyor assume multiple configurations on said conveyor.

14. The method of claim 12 further comprising the step of
   e. Recording an identity of each said item scanned within said field of view with a memory device.

15. The method of claim 14 wherein said memory device comprises software, said software operating to catalogue and organize each said identity of each said item scanned within said field of view.

16. The method of claim 15 whereby said software further operates to identify multiple items simultaneously scanned by said multi-item scanning device.

17. The method of claim 16 whereby said software further operates to distinguish multiple items simultaneously scanned by said multi-item scanning device.

18. The method of claim 12 wherein between about 50% and about 69% of said readable media on each said item conveyed to a point-of-sale station is read.

19. The method of claim 18 wherein substantially all unscanned said readable media on one or more said items is identified by said system as being unscanned.

20. The method of claim 12 wherein between about 70% to about 99% of said readable media on each said item is scanned by said multi-item scanning device.

21. The method of claim 20 wherein substantially all unscanned said readable media on one or more said items for purchase is identified as being unscanned.

* * * * *